United States Patent [19]
Vetter

[11] 3,941,405
[45] Mar. 2, 1976

[54] ADJUSTABLE MOTORCYCLE SIDECAR MOUNTING APPARATUS

[75] Inventor: Craig W. Vetter, Rantoul, Ill.

[73] Assignee: Vetter Design Works, Inc., Rantoul, Ill.

[22] Filed: Nov. 4, 1974

[21] Appl. No.: 520,643

Related U.S. Application Data

[63] Continuation-in-part of Ser. No. 499,969, Aug. 22, 1974.

[52] U.S. Cl. .............................................. 280/203
[51] Int. Cl.² ........................................ B62K 27/12
[58] Field of Search .................................... 280/203

[56] References Cited
UNITED STATES PATENTS

| | | | |
|---|---|---|---|
| 1,146,058 | 7/1915 | Edwards et al. ................ | 280/203 |
| 1,388,387 | 8/1921 | Swan et al. ..................... | 280/203 |
| 1,459,387 | 6/1923 | Yeats et al. ..................... | 280/203 |
| 1,461,759 | 7/1923 | Johnston ........................ | 280/203 |

FOREIGN PATENTS OR APPLICATIONS

| | | | |
|---|---|---|---|
| 426,931 | 4/1935 | United Kingdom ............ | 280/203 |
| 905,282 | 11/1945 | France ........................... | 280/203 |
| 903,409 | 10/1945 | France ........................... | 280/203 |
| 2,671 | 2/1911 | United Kingdom ............ | 280/203 |
| 10,033 | 4/1913 | United Kingdom ............ | 280/203 |

Primary Examiner—Philip Goodman
Assistant Examiner—Terrance L. Siemens
Attorney, Agent, or Firm—Wegner, Stellman, McCord, Wiles & Wood

[57] ABSTRACT

Apparatus for mounting a sidecar to a motorcycle adapted for adjustment by the motorcycle rider during transit to alter the orientation of the motorcycle relative to vertical to match the needs dictated by varying road conditions by providing pivotal connectors located along an axis substantially parallel to the direction of travel for relative pivotal motion between the sidecar and the motorcycle and by providing all other connectors spaced from said axis with means for adjusting their effective length.

19 Claims, 5 Drawing Figures

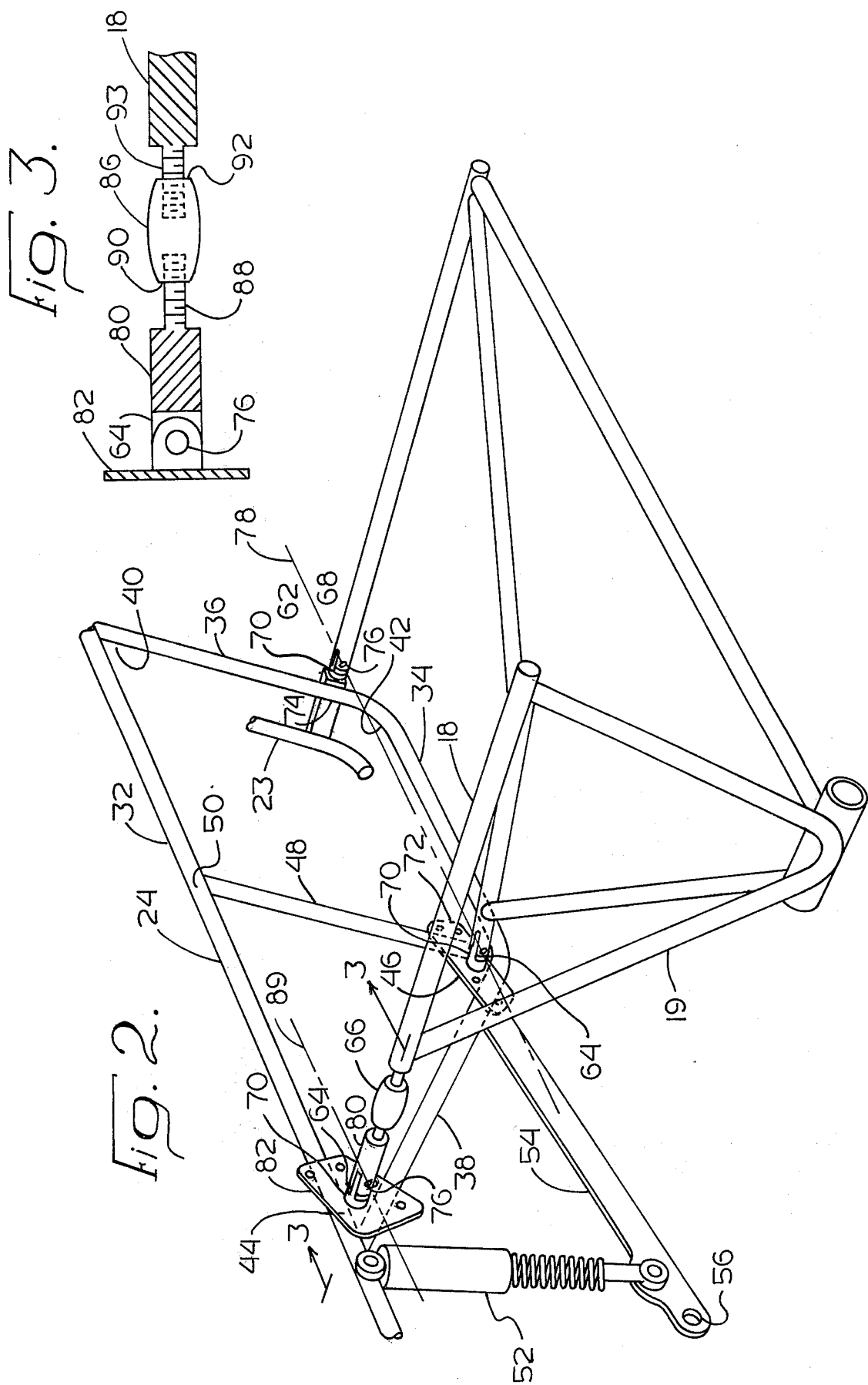

ADJUSTABLE MOTORCYCLE SIDECAR MOUNTING APPARATUS

CROSS-REFERENCE

This application is a continuation-in-part of my copending application Ser. No. 499,969, entitled "Sidecar Frame" filed Aug. 22, 1974.

BACKGROUND OF THE INVENTION

With the recent advent of increased popularity of motorcycles, both as sports vehicles and vehicles for basic transportation, an interest in motorcycle sidecars has been renewed. The substantial increase in passenger and load-carrying capacity provided by a sidecar enhances the utility of the motorcycle. A sidecar also adds an element of stability, the lack of which might otherwise discourage would-be users or purchasers of motorcycles.

Unfortunately, a motorcycle with a sidecar attached is not as easily handled and as maneuverable as a motorcycle without a sidecar attached. This factor has been a principal detraction from sidecar use that has prevented an increase in popularity of sidecars to the extent realized by motorcycles. The difficult handling characteristics of a motorcycle with a sidecar attached are due primarily to the fact that such a vehicle is asymmetrical with respect to both its center of gravity and its aerodynamic characteristics. The center of gravity of a motorcycle is located along the elongate axis of the motorcycle extending between the front and rear wheels such that upon acceleration or deceleration, or upon going uphill or downhill, there is no tendency for the motorcycle to turn. Likewise, a motorcycle without a sidecar is aerodynamically symmetrical with respect to the elongate axes or axis of travel such that headwind force components tending to move the motorcycle to the left are balanced by equal forces tending to move the motorcycle to the right.

When a sidecar is added, typically by mounting it to the right side of the motorcycle, the center of gravity of the combined motorcycle and sidecar moves to the right of the motorcycle and is located somewhere between the wheels of the motorcycle and the sidecar, depending upon the respective loads carried by each. Due to the offset center of gravity, and thus the offset center of inertia, and due to the fact that drive is only applied to the rear wheel of the motorcycle, a tracking problem exists. For example, during acceleration, the combined vehicle tends to pivot about the center of gravity and turn right, which must be counterbalanced by the motorcycle rider turning the motorcycle wheel to the left. More important than acceleration forces, because of the usually greater time duration of wind forces than that of acceleration forces, the headwind force components tending to move the combined vehicle left and right, respectively, do not necessarily counterbalance one another such that a net force is often present tending to move the combined vehicle to the right. The need to apply continuous counterbalancing forces to prevent the combined vehicle from turning to the right can be extremely fatiguing for the driver of the motorcycle, and thus substantially detract from the desired to use the sidecar.

There have been basically two approaches to counter the tendency of the combined motorcycle and sidecar vehicle to move to the right: the provision of toe-in and the provision of leanout. Toe-in refers to the slight inward set of the sidecar wheel in relation to the wheels of the motorcycle. As would be expected, setting of the sidecar wheel so that it is directed to the left counteracts the aforementioned tendency of the vehicle to turn to the right. Leanout refers to the orientation of the motorcycle wheels with respect to vertical. Leaning the motorcycle to the left, away from the sidecar, creates a tendency for the vehicle to turn to the left, thus also counterbalancing the aforementioned forces tending to move the vehicle to the right.

While provision for leanout and toe-in adjustment have, to a certain extent, solved the tracking problem, partially because of the complicated nature of prior motorcycle sidecar mounting arrangements, the adjustments thereto needed to set a desired degree of leanout and toe-in have likewise been complicated and time-consuming. Such adjustments to known sidecar mountings can only be performed while the motorcycle and sidecar are stationary and various measurements can be made. Furthermore, because of the nature of known mounting arrangements, the adjustment of leanout often affects the toe-in adjustment, and vice versa, thus requiring alternate multiple adjustments to each. The precise manner by which the adjustment to leanout is made, of course, varies depending upon the make and type of motorcycle and sidecars, but a brief description of the complicated nature of the problem involved can be found in "Principles of Rigging" (a brief guide to setting up a sidecar) by Frank Thompson Zuch, Don Spaulding and R. L. Carpenter at 86, et seq., of the April 1973 issue of *Cycle World*. As pointed out in this article, in most cases only experimentation will divulge the optimum setting for leanout. Detaching the sidecar often results in the optimum setting being lost. Thus, the more complicated and time-consuming the adjustment procedure, the less likely the user will be willing to detach the sidecar once attached, which of course detracts from the versatility and user satisfaction which could otherwise be enjoyed.

More importantly, even in mounting arrangements in which the adjustment procedure has been somewhat simplified, such adjustments have always been static or fixed, and because of this have only met with partial success in solving the tracking problem. The adjustments can only be made when the vehicle is stationary, and once made, the adjustment mechanisms are locked into place and cannot be altered during transit. An optimum setting is selected by experimentation and according to the most likely road and driving conditions that will be encountered during travel according to the user's judgment.

For example, in the mounting arrangement shown in U.S. Pat. No. 1,461,759, the leanout may be adjusted, but only when the vehicle is stationary. The sidecar is partially secured to the motorcycle by two pivotal connectors adjacent the bottom of the sidecar to permit relative pivotal motion. The mounting further includes two elongate connectors which extend from the sidecar adjacent the pivotal connectors to points on the frame of the motorcycle vertically spaced from the pivotal connectors. While the motorcycle is oriented in the desired pivotal position, nuts on the ends of the elongate connectors are screwed tightly against opposite sides of the frame of the motorcycle. Tightening of the nuts rigidly secures the sidecar to the motorcycle and fixes the desired leanout of the motorcycle. A turnbuckle member extending from the sidecar adjacent the pivotal connectors to the motorcycle at a point thereon vertically spaced from the pivotal connectors is provided to make the leanout adjustment and to hold the motorcycle in the desired position while the nuts on the elongate connectors are tightened. For all practical purposes, the nuts on the elongate connectors cannot be loosened by the motorcycle rider during transit. Even if this were possible, to do so would render the mounting insecure, and for safety reasons the nuts should not be loosened during transit. The turnbuckle is ineffective to adjust leanout when the elongate connectors are tightly fastened to the motorcycle during transit.

The provision of toe-in, even with means to adjust it during transit, is insufficient to solve the tracking problem. If the sidecar wheel is toed in more than 3°, excessive tire wear results, and thus, for all practical purposed, 3° is the maximum amount of toe-in which may be permitted. This limited range of permissible adjustment to toe-in is insufficient to solve the tracking problem for the wide range of operating conditions that may be encountered. Thus, if the tracking problem is to be resolved, it can only be done by altering leanout as the varying operating conditions may dictate.

While, because of the manner in which adjustments must be made to known mounting arrangements, the amount of leanout must be fixed, the conditions of wind speed, acceleration, and street and highway grades are constantly changing under normal driving conditions. A leanout adjustment for high speed highway driving when headwinds are maximum is completely inappropriate at a lower speed which might be necessitated. A setting for high speed will cause the vehicle to tend to turn to the left at low speeds. A setting which may be proper when a passenger is being carried will be improper when a passenger is not being carried unless ballast is provided. Gravitational forces acting on the vehicle when it is climbing a hill will tend to cause the vehicle to turn to the right, whereas those same gravitational forces when the vehicle is traveling down the other side of the hill will tend to make it go to the left. Likewise, acceleration will tend to make the vehicle turn right, and deceleration will tend to make the vehicle turn left. Another factor which normally cannot be taken into consideration when arriving at an optimum setting for leanout is the presence of side winds which may tend to cause the vehicle to turn either left or right.

Clearly, these and many varying conditions cannot all be served by a single "optimum" setting, and thus, no matter what the fixed setting may be, the motorcycle rider may frequently find himself "wrestling" with the motorcycle to maintain a straight course.

SUMMARY OF THE INVENTION

The present invention is concerned with a motorcycle sidecar mounting apparatus which is adjustable to vary the vertical lean of a motorcycle and, in particular, to such a mounting apparatus which is adjustable by the motorcycle rider during transit as varying conditions dictate different degrees of leanout for ease of handling.

In accordance with the present invention, the motorcycle sidecar mounting apparatus comprises only two types of load-bearing connectors: pivotal connectors and adjustable connectors. The pivotal connectors, if more than one, are all located along a common pivot axis parallel to the direction of travel, which coincides with elongate axes of the motorcycle and sidecar, and secure the sidecar to the motorcycle for pivotal motion therebetween about the axis. The only means other than the pivotal connectors for rigidly mounting the sidecar to the motorcycle are the adjustable connectors. The adjustable connectors are vertically spaced from the pivot axis and adjustable in effective length between the motorcycle and the sidecar to vary the relative pivotal position therebetween and thus to vary the leanout as operating conditions may dictate.

Most, if not all, motorcycle frames have a trapezoidal shape with first and second vertices adjacent opposite ends of the lowermost one of parallel sides of the trapezoid, and a third vertex adjacent the rearward end of the upper parallel side of the trapezoid. These three vertices are points of maximum strength of the frame. In a preferred embodiment of the mounting apparatus of the present invention, which comprises only three connectors, a pair of pivotal connectors is connected to the motorcycle frame adjacent the first and second vertices, respectively. The single adjustable connector is connected to the frame adjacent the third vertex within easy reach of the motorcycle rider for manual adjustment.

The adjustment mechanism may be a threaded connection such as a turnbuckle that may be manually adjustable or powered by an electric motor or the like. Alternately, the adjustment mechanism may comprise a piston and pneumatic or hydraulic cylinder arrangement. For maximum mechanical advantage, the adjustable connector is substantially horizontally disposed and adjustable in length in a direction substantially transverse to the elongate axis of the motorcycle.

In order to minimize the required length of the load-bearing connectors to thereby maximize their strength, they are preferably connected to the sidecar at points located directly alongside corresponding connection points on the motorcycle.

Likewise, to minimize bending stress forces acting on the adjustable connector along its length, when the apparatus is used to mount a sidecar having a frame comprising a plurality of interconnected elongate struts, at least one of which extends in a direction transverse to the direction of travel, the adjustable connector is secured to the end of the transverse strut coaxially therewith. This connection to the sidecar frame renders adjustable the effective length of the strut. The pivotal connectors are mounted to the sidecar along an axis which is vertically spaced from the end of the transverse strut.

A further feature of the present invention is that the adjustable connector may employ clevis and pin-type connections so that the sidecar can be readily attached and detached from the motorcycle.

Still a further feature of the mounting apparatus is that the spacing between the pivot axis and the adjustable connector is maximized to minimize the amount of force needed to make the adjustment.

Moreover, when the adjustable connector is manually adjustable, it is secured to the motorcycle adjacent the top of the frame to facilitate accessibility thereto by the rider.

BRIEF DESCRIPTION OF THE DRAWINGS

The foregoing features and advantages will be made more apparent, and further features and advantages will be disclosed, in the following description of the preferred embodiment taken in conjunction with the drawings, in which:

FIG. 2 is a perspective view of a sidecar frame connected at preferred locations to a motorcycle frame by means of the pivotal connectors and an embodiment of the adjustable connector frame;

FIG. 3 is a view of a partial section taken along section line 3—3 of FIG. 2. illustrating the preferred manually operable adjustable connector;

DESCRIPTION OF THE PREFERRED EMBODIMENT

Figure 1:
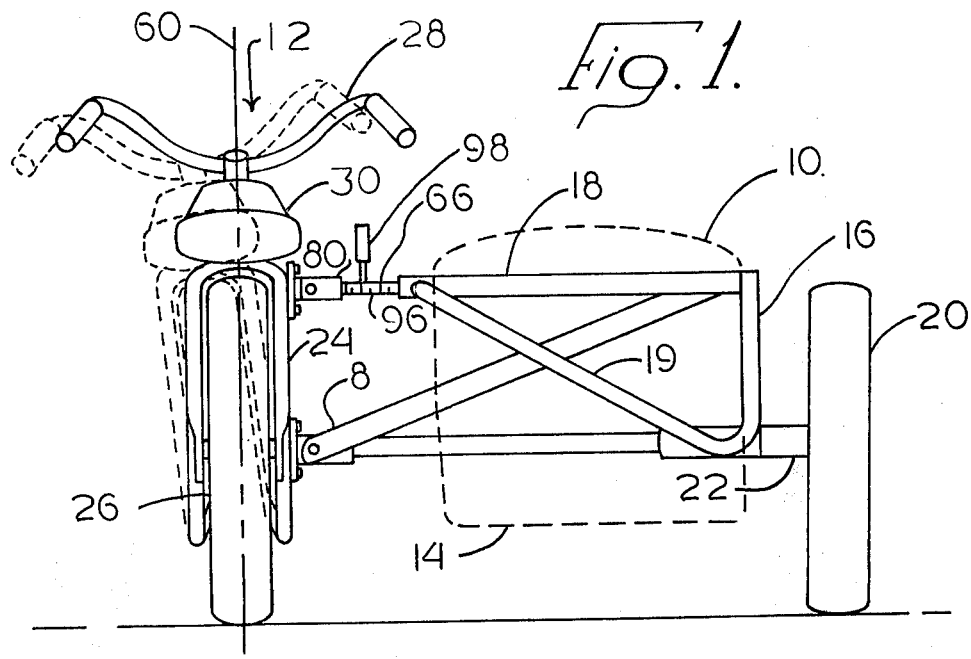
FIG. 1 is a rear end view of a motorcycle and sidecar employing the adjustable mounting apparatus of the present invention and illustrating different degrees of leanout.

Turning now to FIGS. 1 and 2, the adjustable mounting apparatus 8 is shown as employed to connect a sidecar 10 to a motorcycle 12. The sidecar 10 typically has a sidecar coach 14, which is carried by a sidecar frame 16 comprising a plurality of interconnected elongate struts. At least one of the struts, such as strut 18 or strut 19, lies in a plane substantially transverse to the direction of travel and to the elongate axis of the motorcycle and sidecar. A sidecar wheel assembly including a sidecar wheel 20 and a sidecar wheel axle 22 is mounted to one side of the sidecar frame, and the other side of the sidecar frame is connected to the motorcycle 12 by means of the adjustable mounting apparatus 8.

The motorcycle includes a frame 24 typically constructed of interconnected struts, as best seen in FIG. 2, and front and rear wheels 26, a handlebar 28, and a seat cushion 30, as best seen in FIG. 1.

Referring specifically to FIG. 2, the typical motorcycle frame 24 is seen to comprise an identical pair of transversely connected frame sections 23 and 24, each of which comprises a plurality of elongate struts interconnected in a substantially trapezoidal shape. The right trapezoid frame section 24 has upper and lower parallel elongate struts 32 and 34, respectively, and a pair of diagonal struts 36 and 38 which extend between the respective opposite ends of struts 32 and 34. Diagonal strut 36 extends between the forward ends of parallel struts 32 and 34 and respectively defines therewith upper and lower forward vertices 40 and 42 of the trapezoid. Diagonal strut 38 diverges from diagonal strut 36 in the upward direction and extends between the rearward ends of parallel struts 32 and 34, defining therewith upper and lower rearward vertices 44 and 46, respectively. Struts 34, 36 and 38 may be integrally formed by bending a single piece of tubular stock but they are not necessarily so made. In addition to the basic trapezoid frame section, an additional diagonal strut 48, substantially parallel to strut 36, may extend from vertex 46 to a point 50 on strut 32 intermediate its opposite ends.

A suspension system is typically provided by means of a dashpot-type shock absorber 52 and a swing arm 54. The axle of the rear motorcycle wheel extends between axle bearing opening 56 at the ends of the swing arms 54, only one of which is shown. While not shown in FIG. 2, the seat cushion 30 is located above frame member 32 adjacent vertex 44.

Referring again to FIG. 1, by employing the sidecar mounting apparatus 8, the orientation of motorcycle 12 with respect to the vertical, as represented by vertical axis slot 60, may be adjusted. The motorcycle, as drawn in solid lines, is seen in its vertical position and drawn in broken line is shown in an exemplary leanout position to which it may be adjusted. While not shown in the drawings, the adjustable mounting apparatus could be employed to cause the motorcycle to lean inwardly toward the sidecar, if so desired.

The mounting apparatus 8 may comprise only two pivotal connector assemblies 62 and 64 and a single adjustable connector assembly 66. The pivotal connector assemblies 62 and 64 mount the sidecar to the motorcycle for relative pivotal motion therebetween, and the adjustable connector assembly 66 includes means to vary its effective length to thereby selectably vary the relative pivotal position between the sidecar and the motorcycle and, thus, vary the leanout of the motorcycle.

More particularly, with regard to the pivotal connector assemblies 62 and 64, each comprises a clevis s female member 68 attached to, or integrally formed at the end of, appropriate struts of the sidecar frame 16 and a male connector 70, which is received within the slot of the clevis connector. The male connector 70 may be secured to the frame of the motorcycle by means of a plate 72 mounted to the frame by U-bolts or the like, or by means of a weld joint, such as at 74. When the male connector 70 is mated within the slot of the clevis connector 68, a pin 76 extending through both secures them together but permits relative pivotal motion about a pivot axis 78. To maximize the strength of the connection, one of the pivotal connector assemblies is located adjacent the lower forward vertex 42, and the other is located adjacent the lower rearward vertex 46, which are points of maximum strength of the motorcycle frame. While only two pivotal connector assemblies are shown, it should be appreciated that if other pivotal connectors were to be added, they would have to be mounted for pivotal motion about the common pivotal axis 78.

The adjustable connector assembly 66, as seen in FIG. 2, preferably connects the sidecar to the motorcycle frame adjacent the upper rearward vertex 44 of the trapezoid, which, like the other vertices, is a position of maximum strength of the frame. This location facilitates accessibility to the adjustable connector by the motorcycle rider. In any event, even if connected to the frame elsewhere, it must be connected to a point on the frame vertically spaced from pivot axis 78. The greater the spacing between the adjustable connector and the pivot axis, the lesser the force needed to make an adjustment.

The relative location on the sidecar of the adjustable connector is likewise a matter of importance. Preferably, the adjustable connector is secured to the sidecar frame at a point directly alongside the connection point on the motorcycle so that the adjustable connector is substantially horizontally disposed. This minimizes the length of the adjustable connector 66 and thus minimizes the thickness dimension of the elements thereof needed to provide the requisite strength to withstand bending forces applied thereto. Further, if the adjustable connector assembly 66 is substantially horizontally disposed, substantially all of the adjustment forces are applied in the direction of desired movement. The application of bending forces or forces tending to break the connection of the sidecar frame and the adjustable connector is also minimized by mounting the adjustable connector assembly to the frame, at the end of, and coaxial with, a strut thereof, such as strut 18, which is also substantially horizontally disposed transverse to the pivot axis 78. The adjustable connector assembly 66, in fact, may be considered a means for adjusting the effective length of such a sidecar frame strut. Finally, without regard to whether the adjustable connector assembly is horizontally disposed, connecting the adjustable connector assembly to the sidecar frame at a point vertically spaced from the pivotal connector makes the mounting between the sidecar and motorcycle more rigid than if the adjustable connector assembly were secured to the sidecar frame adjacent the pivotal connectors.

Like the pivotal connector assemblies, the adjustable connector assembly 66 may be secured to the frame by means of a clevis at the end of a connector member 80 and a male connector member 70 that is received within the slot of the clevis. The male connector member is secured to the frame of the motorcycle by means of a plate 82 and the connection is completed by a pin 76 that passes through the sides of the clevis and the male connector when they are matingly engaged. Preferably, the pivot axis 84 provided by the clevis and pin connection is substantially parallel to the horizontal pivot axis 78 of the pivotal connector assemblies.

The principal functional characteristic of the adjustable connector is that it may be used to alter the relative pivotal position between the motorcycle and the sidecar and rigidly hold the motorcycle and sidecar in whatever relative position is selected. Preferably, this function is performed by varying the effective length of the adjustable connector. Different mechanisms can be used to achieve this result.

As best seen in FIG. 3, for manual adjustment, the adjustable connector preferably comprises a turnbuckle 86 in the form of an elongate handle grip with openings at opposite ends 90 and 92 which are internally threaded in opposite directions. Secured to the end of connector member 80 is an elongate externally threaded member 88 which is threaded into opening 90. Another externally threaded elongate member 93 is secured to the sidecar frame at opening 92. Because the two members are threaded in opposite directions, when turnbuckle handle grip 86 is rotated about its elongate axis in one direction, the sidecar and the motorcycle are pulled closer together at this connection point, and when the handle turnbuckle 86 is rotated in the opposite direction, the sidecar and motorcycle are pushed farther apart at this connection point. Thus, the motorcycle rider, by turning the turnbuckle, may pivot the motorcycle about pivot axis 78 and thereby adjust the orientation of the motorcycle with respect to vertical.

Alternately, as shown in FIG. 1, the adjustable connector assembly 66 may comprise a single elongate member 96 which is threaded in opposite directions, at opposite ends, into respective openings at the ends of transverse strut 18 of the sidecar and connector member 80. A lever 98 may be provided to facilitate manual rotation of member 96 by the motorcycle rider during transit. Like the turnbuckle arrangement shown in FIG. 3, when the member 96 is rotated in one direction, leanout is increased, and when turned in the opposite direction, leanout is decreased.

Figure 4:
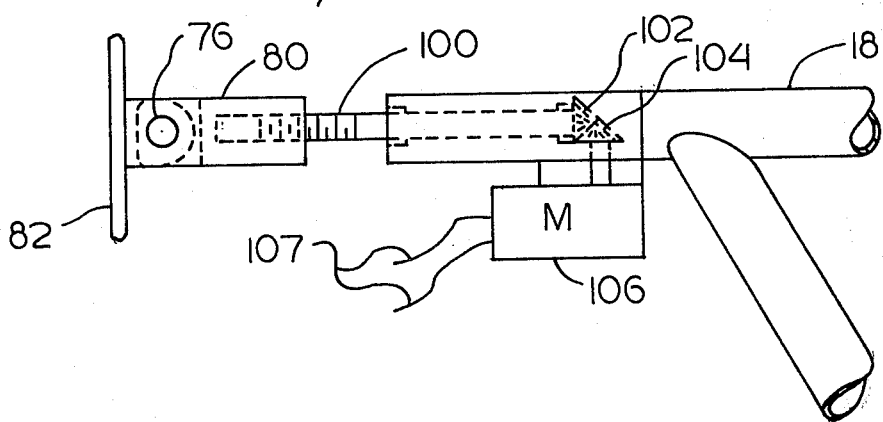
FIG. 4 is a view of a section of another embodiment of the adjustable connector which may be powered by an electrical motor and gear arrangement.
Figure 5:
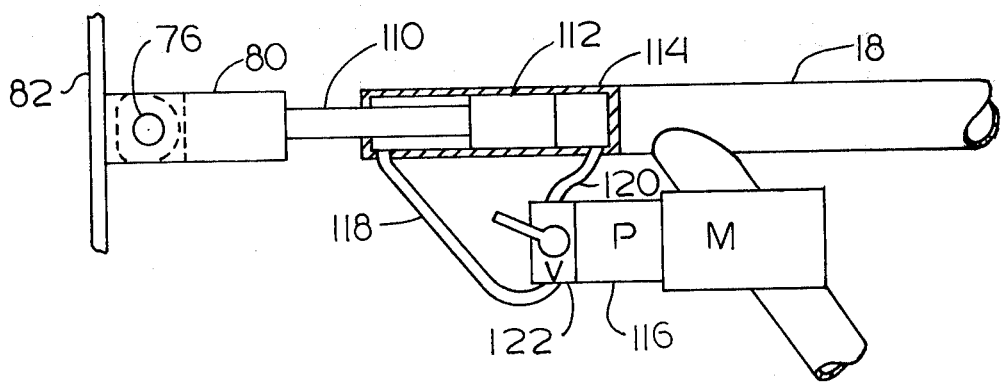
FIG. 5 is a view of a section of yet another embodiment of the adjustable connector comprising a piston and pneumatic cylinder and a controlled power source therefor.

As shown in FIGS. 4 and 5, the adjustable connector assembly need not be manually operrated. As seen in FIG. 4, the adjustable connector may include an elongate threaded member 100, one end of which is threaded into an opening at the end of connector member 80. Member 100 may be driven at its other end by means of bevel gear 102, which, in turn, is driven by bevel gear 104 that is powered by an electrical motor 106. The electric motor may receive electrical energy through leads 107 from the generator or battery of the motorcycle.

Alternately, as as seen in FIG. 5, the adjustable connector assembly 66 may be pneumatically or hydraulically powered. The adjustable connector assembly 66 shown in FIG. 5 includes a piston arm 110 secured at one end to connector member 80. The other end of piston arm 110 carries a piston 112 that is laterally positionable within a cylinder 114 secured to the sidecar frame at the end of transverse strut 18. A source of pressure 116 is connectable to opposite sides of the piston by means of pressure lines 118 and 120 through a valve 122. The rider, by activating valve 122, may create a differential pressure between the opposite sides of the piston to cause the piston 112 and the motorcycle 12 to move relative to the cylinder 114 and thereby selectively adjust the motorcycle leanout.

It should be appreciated that when the adjustable connector assembly is manually operated, it should be located within easy reach of the rider, such as adjacent vertex 44 beneath the seat cushion 30, but when the adjustable connector assembly is powered by an electrical motor, or otherwise, it need not be so located.

I claim:

1. Apparatus for mounting a sidecar to a motorcycle and to adjustably vary during transit the lean from vertical of the motorcycle, comprising in combination:
   means for securing the sidecar to the motorcycle for pivotal motion about an axis substantially parallel to the direction of travel of the motorcycle and sidecar; and
   an elongate member secured to both the motorcycle and the sidecar at respective locations substantially spaced vertically from the axis of said pivotal securing means, and adjustable in length when secured to the sidecar and the motorcycle for selectively varying the pivotal position of the motorcycle relative to the sidecar, said elongate adjustable member being rigid and comprising the only rigid means other than said pivotal securing means for mounting the sidecar to the motorcycle.

2. The mounting apparatus of claim 1 in which said elongate adjustable member is coaxially connected with an elongate strut of a sidecar frame.

3. The mounting apparatus of claim 1 in which said elongate adjustable member is substantially horizontal.

4. The mounting apparatus of claim 1 in which the adjustable means comprises an elongate connector having one end fixedly secured to the sidecar and the other end secured to the motorcycle for pivotal motion about an axis substantially parallel to the direction of travel, and means for varying the effective length of the connector.

5. The mounting apparatus of claim 4 in which said elongate connector includes a cylinder, a piston slidably received therein, and means for selectively applying differential pressures on opposite sides of the piston to position the piston within the cylinder.

6. The mounting apparatus of claim 1 in which said motorcycle has a seat and said adjustable member is manually actuatable for effecting said adjustment and is adjacent the seat.

7. The mounting apparatus of claim 6 in which said elongate adjustable means includes another elongate member threadedly interconnected with the manually actuatable member, said actuatable member being rotatable relative to the other member to adjust the effective combined length to the members.

8. The mounting apparatus of claim 7 in which said actuatable member is a turnbuckle.

9. The mounting apparatus of claim 7 in which said other member is an elongate strut of a sidecar frame.

10. The mounting apparatus of claim 7 including a motor and means linking the motor with one of the threaded members to transmit rotary motion thereto.

11. In combination:
a sidecar frame having a pair of opposite sides and a plurality of interconnected elongate struts at least one of which extends between said opposite sides with one end thereof adjacent one of said sides; and
apparatus for adjusting the angular position of a motorcycle relative to the sidecar frame when attached thereto, including
means adjacent said one of the sides for mounting the sidecar frame to the motorcycle for relative pivotal motion therebetween about an axis vertically spaced from said one end of the one strut and substantially parallel to the direction of travel, and
means for securing the one end of said one strut to the motorcycle including means for adjusting the effective length of the one strut to change the angular position of the motorcycle about said axis.

12. The adjusting apparatus of claim 11, in which said one strut is in a horizontal plane above said pivot axis.

13. The adjusting apparatus of claim 11, in which the securing means is connected at one end thereof to the one end of the one strut and is connected at its other end to the motorcycle and said adjusting means comprises means to change the spacing between said one and the other ends, the length of said securing means being included in the effective length of the one strut.

14. The adjusting apparatus of claim 13 in which the adjusting means has an axis which is substantially coaxial with the axis of the one strut.

15. The adjusting apparatus of claim 11 in which said adjusting means includes two interconnected members and has a length defined by the distance between respective opposite ends thereof, one of said opposite ends being secured to the one end of said one strut and the other one of said opposite ends being connected to the motorcycle.

16. The adjusting apparatus of claim 15 in which one of said members includes a cylinder, and the other of said members comprises a piston slidably received within said cylinder and said adjusting means further includes means to apply pressures to opposite sides of the piston to position the piston within the cylinder.

17. The adjusting apparatus of claim 15 in which said two members have interconnected threaded portions.

18. The adjusting apparatus of claim 17 including a source of rotary power, and means for connecting said source of rotary power with one of said threadably connected members to rotate it and thereby move it relative to the other member.

19. The adjusting apparatus of claim 17 in which one of said threaded members comprises a turnbuckle.

* * * * *